United States Patent [19]

Merlo et al.

[11] 3,932,377
[45] Jan. 13, 1976

[54] HYDROSOLUBLE MONOAZOIC CATIONIC DYES AND PROCESS FOR PREPARING SAME

[75] Inventors: Fabrizio Merlo, Saronno (Varese); Ruggero Battisti, Novara; Danilo Domenis, Saronno (Varese), all of Italy

[73] Assignees: Montecatini Edison S.p.A.; Aziende Colori Nazionali Affini Acna S.p.A., both of Milan, Italy

[22] Filed: Dec. 6, 1973

[21] Appl. No.: 422,352

Related U.S. Application Data

[63] Continuation of Ser. No. 203,861, Dec. 1, 1971, abandoned.

[52] U.S. Cl. ......... 260/158; 260/146 R; 260/465 E; 260/490
[51] Int. Cl.² ..................... C09B 29/08; D06P 3/76
[58] Field of Search ...................... 260/146 R, 158

[56] References Cited
UNITED STATES PATENTS

| | | | |
|---|---|---|---|
| 2,864,812 | 12/1958 | Bossard et al.................... | 260/146 R |
| 3,097,198 | 7/1963 | Fishwick et al.................. | 260/158 X |
| 3,280,101 | 10/1966 | Straley et al..................... | 260/158 |
| 3,335,125 | 8/1967 | Illy................................... | 260/158 |
| 3,342,800 | 9/1967 | Towle et al........................ | 260/158 |
| 3,405,118 | 10/1968 | Sartori............................... | 260/158 |
| 3,442,886 | 5/1969 | Dickey et al...................... | 260/158 |
| 3,634,389 | 1/1972 | Entschel et al................... | 260/158 |
| 3,709,872 | 1/1973 | Koller................................ | 260/207.1 |
| 3,763,140 | 10/1973 | Entschel et al................... | 260/158 |
| 3,816,390 | 6/1974 | Weaver.............................. | 260/158 |

*Primary Examiner*—Floyd D. Higel
*Attorney, Agent, or Firm*—Hubbell, Cohen & Stiefel

[57] ABSTRACT

Hydrosoluble, cationic, azo dyes of the formula:

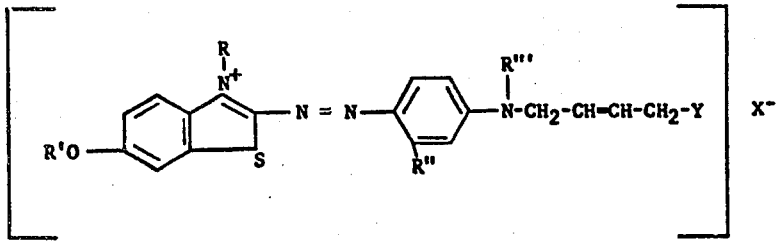

wherein:
R is an alkyl or aralkyl group;
R' is an alkyl group having from 1 to 4 carbon atoms;
R'' is H, an alkyl group having from 1 to 4 carbon atoms or a halogen;
R''' is an alkyl group having from 1 to 4 carbon atoms or a $C_1-C_4$ alkyl group substituted by a halogen, cyano, hydroxy, alkoxy or acyloxy group;
Y is a cyano, amido, acyloxy or carboalkoxy group; and
X is an anion, are obtained by:
a. diazotizing a 2-amino-6-alkoxybenzothiazole of the formula (II):

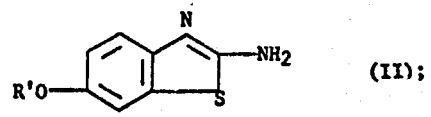

b. coupling the resultant diazo compound in an acid solution with a tertiary amine of the formula (III):

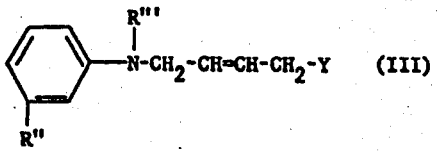

wherein R', R'', R''' and Y are as defined above; and
c. quaternizing the resultant dye.

11 Claims, No Drawings

HYDROSOLUBLE MONOAZOIC CATIONIC DYES AND PROCESS FOR PREPARING SAME

CROSS-REFERENCE TO RELATED APPLICATIONS

This is a continuation of application Ser. No. 203,861, filed 12/1/71, now abandoned.

BACKGROUND OF THE INVENTION

Field of the Invention

The present invention relates to dyes, and in particular, to hydrosoluble, monoazoic, cationic dyes.

SUMMARY OF THE INVENTION

According to the invention, there are provided a class of hydrosoluble, cationic, azo dyes which do not contain any sulfonic or carboxylic acid groups, and which have the formula:

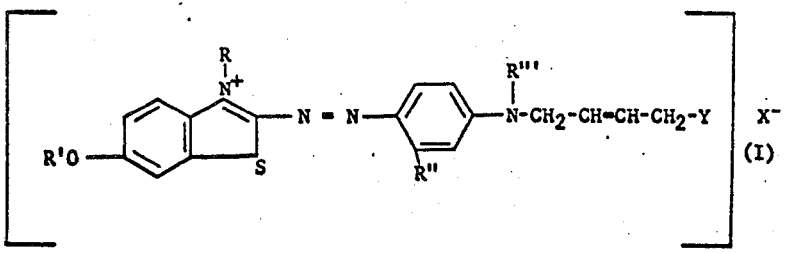

wherein:
R is an alkyl or aralkyl group;
R' is an alkyl group having from 1 to 4 carbon atoms;
R'' is H, an alkyl group having from 1 to 4 carbon atoms, or a halogen;
R''' is an alkyl group having from 1 to 4 carbon atoms, or a $C_1$–$C_4$ alkyl group substituted by a halogen, cyano, hydroxy, alkoxy or acyloxy group;
Y is a cyano, amido, acyloxy or carboalkoxy group; and
X is the anion of a mineral acid, such as: chloride, bromide, iodide, phosphate or sulfate anion or the anion of a complex acid of a metal halogen, such as: the trichloro-zincate anion, or the anion of an organic acid, such as: an alkyl-sulfate or an arylsulfonate anion.

The dyes of formula (I) are particularly advantageous because of their high dyeing power and because, as a result thereof, they lead the obtention of a very high intensity of coloring in polyacrylonitrile fibers, with excellent general fastness characteristics. It is known, with respect to polyacrylonitrile fibers, that one of the basic characteristics required for cationic dyes is a high saturation index for the acid radicals of said fibers, and that without such a high saturation index it is impossible to obtain deep shades.

Moreover, it is also known that in order to obtain navy blue shades it is, in general, necessary to use mixtures of two or more such dyes, which sometimes gives rise to considerable tinctorial difficulties, since it is necessary to have available mixtures of dyes having the same dyeing rate.

By using the dyes of formula (I), with their high saturation index, it is possible to achieve uniform navy blue dyeings on polyacrylonitrile fibers, which are superior to those obtainable with known dyes having an analogous structure, wherein the tertiary nitrogen atom has two saturated alkyl chains which may also be substituted. Dyeings using the present dyes are also superior to those obtained with analogous dyes wherein Y is H or those having unsaturated chains, or substituted chains, with a lesser number of carbon atoms, which dyes have a lower saturation index than the present dyes.

Finally, with the present dyes, substantial improvement in the fastness to moisture is obtained as compared with the known dyes.

The new dyes of the formula (I) are prepared by a process comprising the steps of:

a. diazotizing a 2-amino-6-alkoxybenzothiazole of the formula (II):

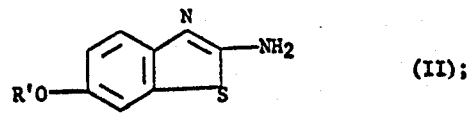

according to conventional methods, for example, the method disclosed in Houben-Weyl: Methoden der organischen Chemie — vol. X3 (1965);

b. coupling, in an acid solution, the thus obtained diazo compound with a tertiary amine of the formula (III):

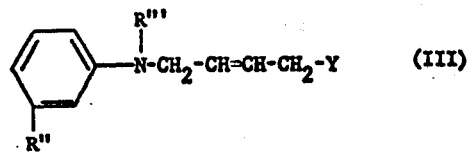

wherein R', R'', R''' and Y are as defined above; and c. quaternizing the resultant dye. To effect the quaternization, the obtained dye is dried, then dissolved in an inert organic solvent and alkylated with a known alkylating agent. Among the alkylating agents which may be used, there are methyl bromide or iodide, ethyl bromide or iodide, propyl bromide or iodide, benzyl chloride or bromide, chloroacetamide, β-chloropropionamide, β-chloropropiontrile, dimethyl or diethyl sulfate, methyl benzenesulfonate and methyl-, ethyl-, or propyl-p-toluensulfonate. Dimethyl or diethyl sulfate and methyl-p-toluensulfonate are the preferred alkylating agents. Generally, the alkylating agent is used in excess with respect to the dye.

The inert organic solvents used in the alkylation step are the aromatic hydrocarbons, and halogenated and nitrated aromatic hydrocarbons, such as toluene, xylenes, chlorobenzene, o-dichlorobenzene and nitrobenzene; and the aliphatic hydrocarbons, and halogenated aromatic hydrocarbons, such as chloroform, carbon tetrachloride, tetrachloroethylene and tetrachloroethane.

Water miscible solvents such as dimethylformamide, dimethylsulfoxide, tetrahydrofuran, dioxane, acetone and methylethylketone may also be used as the solvent; and in some cases, the alkylating agent itself may be used in excess as the solvent.

In general, the choice of the solvent will depend on the solubility and the structure of the azoic dye.

Generally, the alkylation is carried out at high temperature and possibly under pressure, although the limits of these parameters must be compatible with the stability of the obtained quaternary dye. The course of the alkylation is usually monitored by means of thin layer chromatography, and the reaction is continued until the chromatogram no longer contains the band corresponding to the non-alkylated dye.

The cationic dye is generally separated by simple filtration of the final alkylation mass in which the dye is an insoluble or slightly soluble precipitate. When separation proves impossible or in any way difficult, it is sufficient to eliminate the solvent either under reduced pressure or by steam distillation.

The purification of the dyes is effected by simple washing with suitable solvents or by dissolution in water to eliminate the insoluble impurities by filtering. The dyes may then be isolated by adding suitable salts, such as sodium chloride or zinc chloride to aqueous solutions thereof.

The novel dyes of the invention may be used for the dyeing and printing of cellulosic fibers mordanted with tannin, silk, leather or synthetic fibers such as cellulose acetate, fibers based on modified acid polyesters or vinylidene polycyanide, but most of all, synthetic fibers based on acrylonitrile polymers and copolymers, which are referred to herein as polyacrylonitrile fibers. This latter term is to be understood as referring to polymers containing more than 80% of polyacrylonitrile. Such fibers are marketed under various tradenames, e.g., "Leacril 16" (Chatillon), "Euroacryl" (Anic), "Velicren" (Snia Viscosa), "Dralon" (Bayer), "Courtelle" (Courtaulds), "Zefran" (Dow Chemical), "Dynel" (Union Carbide), "Vonnel" (Mitsubishi), etc.

The dyeings obtained on such fibers are very uniform and are very intense. Moreover, they are distinguished by their excellent fastness to light, washing, perspiration, fulling, overdyeing, decatizing, potting, solvents, sublimation and fretting or rubbing. The hues which are obtainable vary from green blue to navy blue.

The dyes are insensible to variations in the pH of the dye bath and they may be applied as well in an only slightly acid bath or in a strongly acidic bath. In general the dyeing is carried out at a pH ranging from 4 to 5, and at the boiling temperature (100°C) of the bath. Under normal dyeing conditions, wool and cotton remain completely unaltered.

DESCRIPTION OF THE PREFERRED EMBODIMENTS

The examples which follow illustrate the present invention without thereby limiting its scope in any way. Parts and percentages are to be understood as expressed in percent by weight, except where otherwise indicated.

EXAMPLE 1 a. A solution of nitrosylsulfuric acid was prepared by dissolving 1.55 parts of sodium nitrite in 33 parts of 95% sulfuric acid. To this solution, under stirring, there were added 20 parts of a mixture of acetic and propionic acids (5:1) at a temperature below 8°C, and, immediately thereafter, over about 30 minutes, there was added a solution of 3.65 parts of 2-amino-6-methoxybenzothiazole in 20 parts of a mixture of acetic and propionic acids (5:1) at a temperature between 0° and 4°C. The reaction mixture thus obtained was kept under stirring for 2 hours at a temperature between 0° and 3°C. Thereafter, 0.5 part of urea was added in order to destroy the excess nitrosylsulfuric acid.

b. The diazo solution thus obtained was rapidly added under stirring to a coupling solution prepared in advance, in the following way:

4.3 parts of N-ethyl-N-(4-cyanobutene-2-yl)m-toluidine were dissolved under stirring in 80 parts of 10% sulfuric acid at room temperature, and after 10 minutes, the solution was clarified with carbon or decolorizing earth. Thereupon, a quantity of ground ice was added to the solution in an amount sufficient for maintaining the temperature below 5°C.

This coupling mass was then stirred for 2 hours and diluted with 400 parts of water. The mass was then stirred for 1 hour, after which the precipitated dye was filtered by washing the cake until reaching a neutral reaction to Congo Red. The filtered dye was then dried in an oven, under vacuum at 50°C. Thereby were obtained 7.5 parts of a non-quaternized dye in the form of a red-brown powder, soluble in organic solvents, and having the following structure:

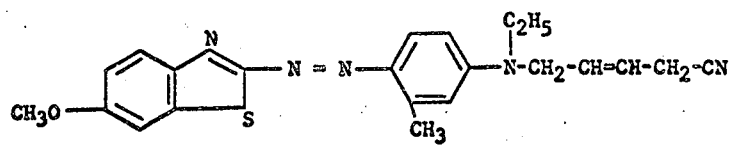

c. For the transformation into the quaternized product, 7.5 parts of the above dye and 80 parts of toluene (at 110°C) were heated to the boiling point, with care being taken to eliminate all possible traces of water by distilling off 10 parts of the toluene. Then the coupling mass was cooled to 80°C and 4.7 parts of dimethyl sulfate were then rapidly added thereto with stirring. The mass was then cooled to room temperature, the precipitate was filtered, washed in 40 parts of toluene and taken up with 50 parts of ethyl acetate. It was then filtered and washed again with 20 parts of ethyl acetate and finally dried at 50°C.

Thereby there were obtained 9.4 parts of a blackish blue powdery dye which dissolved in water with a blue hue. The quaternized dye had the following formula:

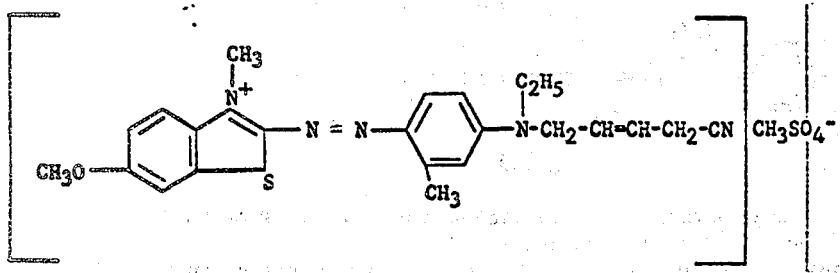

The obtained dye is sufficiently pure to be used for dyeing. For this purpose, 1 part of dye is kneaded together with 2 parts of 50% acetic acid, and the mixture is then dissolved in warm water up to a total volume of 5 liters. To the dye bath was then added 1 part of crystallized sodium acetate and then there were introduced, at a temperature of 60°C, 100 g of previously purified polyacrylonitrile yarn. Then the dye bath was very slowly brought up to 100°C and the yarn was dyed at the boiling temperature for 1 hour. The bath was then slowly cooled to 60°C, the yarn was rinsed with water, soaped at 70°C for 10 minutes with an 0.1% anionic detergent solution, then rinsed with water and finally dried.

The dye thus obtained was of pure blue hue, displaying excellent characteristics of fastness to light, sublimation, and to wet treatments and resistance to solvents.

With dyes of a higher concentration there was obtained a navy blue hue with a complete exhaustion of the bath.

The N-ethyl-N-(4-cyanobutene-2-yl)-m-toluidine is prepared according to known methods by condensing 1-chloro-4-cyano-2-butene (a known compound) and N-ethyl-m-toluidine, i.e:

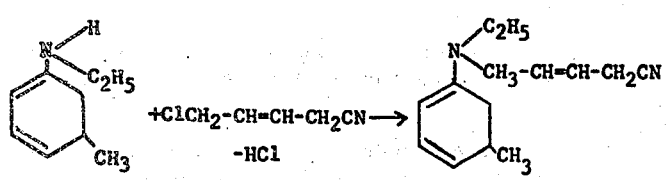

Into a 50 ml flask fitted with a reflux condenser, a stirrer and a therometer, were placed 4.05 g of N-ethyl-m-toluidine, 15 ml of xylol (a mixture of isomers with a b.p. ranging from 137° to 140°C), 0.1 g of hydroquinone and 4.62 g of 1-chloro-4-cyano-butene-2-yl (excess) and 5.5 g of anhydrous $K_2CO_3$. This mixture was kept under a nitrogen atmosphere. The mass was then heated under vigorous stirring, to about 110°C and maintained at that temperature for 6 to 7 hours.

Thereafter the mass was left to cool to room temperature and then was filtered to eliminate the inorganic salts, by washing at the end with a small amount of xylol.

Thereafter, the xylol was eliminated by distillation at reduced pressure (15 mm Hg); the pressure was then further reduced (0.1 mm Hg) and the excess 1-chloro-4-cyano-butene-2-yl was eliminated. The residue may be used, as such, for the preparation of the dye. The yield was 75% with respect to the amine used.

EXAMPLE 2

Following the procedure described in Example 1, 3.9 parts of 2-amino-6-ethoxybenzothiazole were first diazotized and then coupled with 4.3 parts of N-ethyl-N-(4-cyano-butene-2-yl)m-toluidine. The obtained dye was quaternized with dimethyl sulfate. Thereby, 9.6 parts of the quaternized dye were obtained in the form of a bluish black powder that dissolved in water with a blue hue:

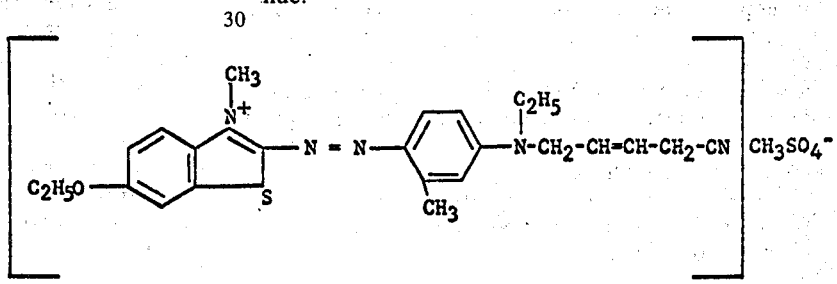

This dye has tinctorial characteristics practically identical with those of the dye of Example 1. If an aqueous solution of the cationic dye is treated with sodium chloride or zinc chloride, one obtains the dye respectively in the form of the chloride or chlorozincate.

EXAMPLE 3

In 80 parts of toluene there were heated at the boiling point (110°C) 7.5 parts of a dye obtained from 3.9 parts of 2-amino-6-ethoxybenzothiazole and 4.1 parts of N-ethyl-N-(4-cyano-butene-2-yl)aniline, according to the process described in Example 1. The boiling toluene solution was then cooled to 80°C and 5.7 parts of diethyl sulfate were rapidly added thereto, with stirring. The mass was thereupon heated to the boiling point (110°C) for 4 hours, then cooled and further processed as described in Example 1.

Thereby there were obtained 10.0 parts of a black powdery cationic dye, soluble in $H_2O$ with a blue hue:

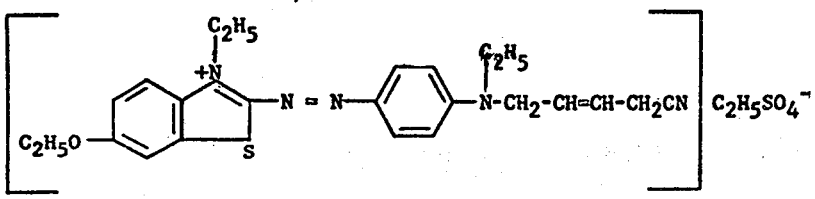

When this dye is applied to polyacrylonitrile yarn according to the procedure described in Example 1, one obtains a coloring of a greenish blue hue, displaying excellent resistance to light, sublimation, wet treatment and solvents.

EXAMPLE 4

3.65 parts of 2-amino-6-methoxybenzothiazole were diazotized according to the procedure described in Example 1. The diazo solution was then rapidly added, under stirring, to a solution of 5.0 parts of N-ethyl-N-(4-acetoxybutene-2-yl)m-toluene in 10 parts of acetic acid and 300 parts of H₂O, clarified with active carbon. For the separation of the dye and the subsequent quaternization of same, the procedures described in Example 1 were followed.

Thereby there were obtained 10.2 parts of a dye in the form of a reddish black powder, soluble in H₂O with a reddish blue hue:

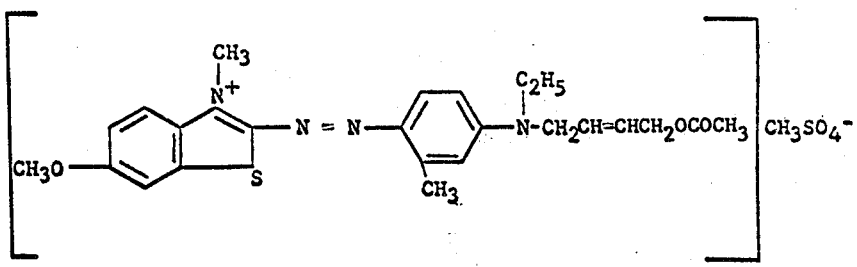

When this dye is applied to polyacrylonitrile yarn according to the procedure described in Example 1, one obtains a reddish blue coloring showing excellent fastness to light and resistance to solvents and wet treatments.

EXAMPLE 5

The procedures set forth in Example 1 were repeated, except that methyl-p-toluenesulfonate at the boiling point (110°C) was used instead of dimethyl sulfonate. Thus, there was obtained a dye of the formula:

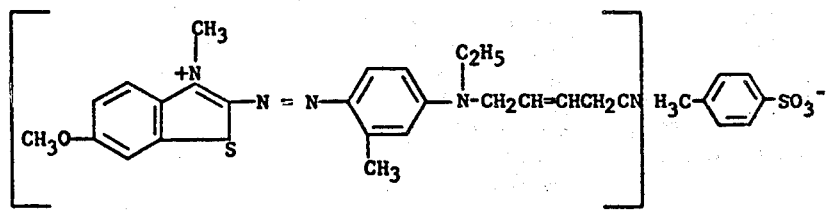

having the same characteristics as those of the dye of Example 1.

Having thus described our invention, what we desire to secure by Letters Patent and hereby claim is:

1. A water soluble, azoic, cationic dye having the formula:

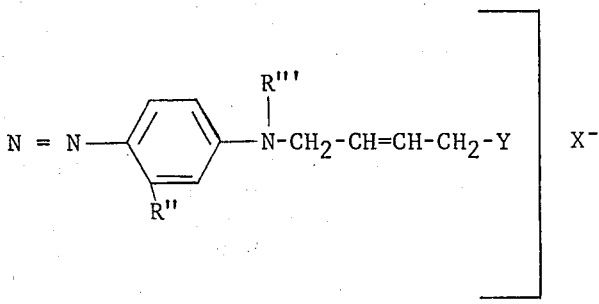

wherein:
R is methyl or ethyl;
R' is alkyl having from 1 to 4 carbon atoms;
R'' is hydrogen, alkyl having from 1 to 4 carbon atoms, or halogen;
R''' is alkyl having from 1 to 4 carbon atoms, or C₁–C₄ alkyl substituted by a halogen, cyano or hydroxy;
Y is cyano or acetoxy; and
X is an anion.

2. A dye according to claim 1 wherein X is the anion of a mineral acid, a complex acid of a metal halogen or an organic acid.

3. A dye according to claim 2 wherein the anion of a mineral acid is chloride, bromide, iodide, phosphate or sulfate.

4. A dye according to claim 2 wherein the anion of a complex acid of a metal halogen is trichloro-zincate.

5. A dye according to claim 2 wherein the anion of an organic acid is an alkyl-sulfate or aryl-sulfonate.

6. A dye according to claim 5 wherein the alkyl-sulfate is CH₃SO₄⁻ or C₂H₅SO$_n$⁻ and the aryl-sulfonate is

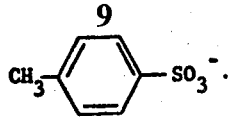
7. A dye according to claim 1 which is
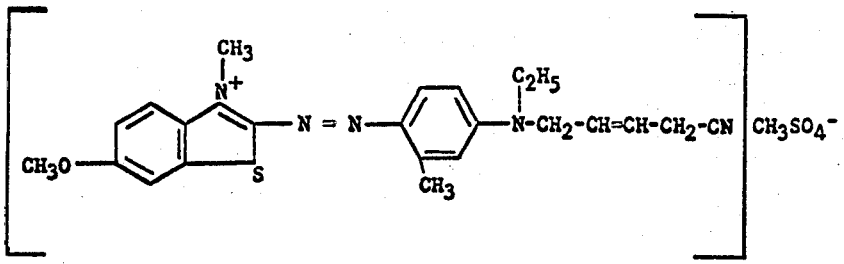
8. A dye according to claim 1 which is
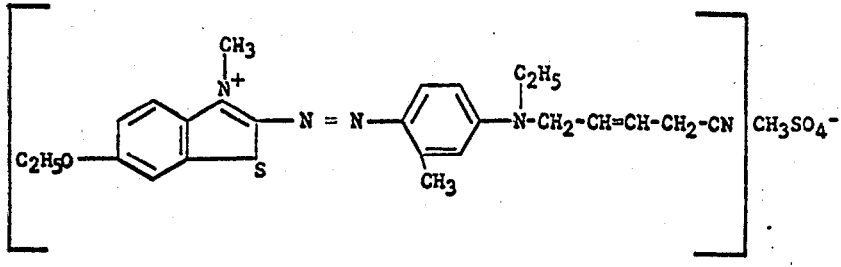
9. A dye according to claim 1 which is
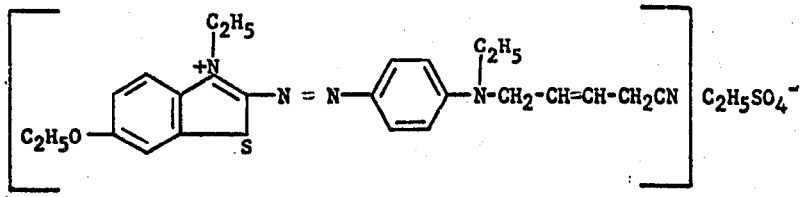
10. A dye according to claim 1 which is
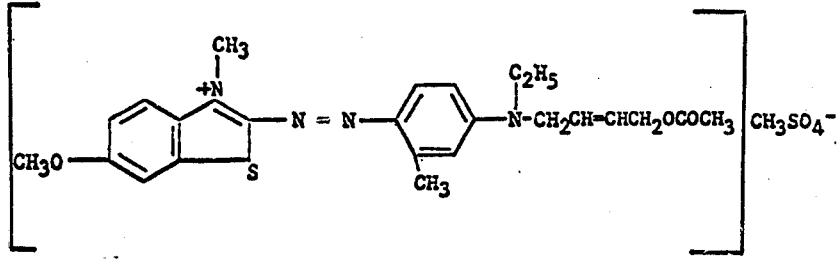
11. A dye according to claim 1 which is
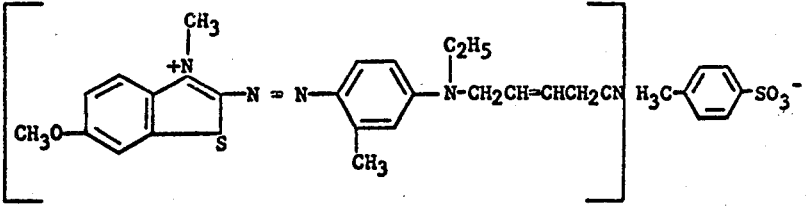
* * * * *

PO-1050
(5/69)

UNITED STATES PATENT OFFICE
CERTIFICATE OF CORRECTION

Patent No. 3,932,377          Dated January 13, 1976

Inventor(s) FABRIZIO MERLO et al

It is certified that error appears in the above-identified patent and that said Letters Patent are hereby corrected as shown below:

Title page, left side, "Foreign Application Priority Data" should read -- Application, Italy 32587-A/70, 12/3/70 --.

Column 2, line 55: "β-chloropropiontrile," should read -- β-chloropropionitrile, --.

Column 4, line 60: "up with" should read -- up in --.

Column 5, line 57: "therometer" should read -- thermometer --.

Signed and Sealed this eleventh Day of May 1976

[SEAL]

Attest:

RUTH C. MASON
Attesting Officer

C. MARSHALL DANN
Commissioner of Patents and Trademarks